(No Model.) 3 Sheets—Sheet 1.

W. H. CHAPMAN.
ELECTRIC MOTOR.

No. 447,939. Patented Mar. 10, 1891.

Witnesses:
Walter E. Lombard.
H. F. Swinton.

Inventor:
William H. Chapman,
by N. C. Lombard
Attorney.

(No Model.) 3 Sheets—Sheet 2.

W. H. CHAPMAN.
ELECTRIC MOTOR.

No. 447,939. Patented Mar. 10, 1891.

Witnesses:
Walter E. Lombard
H. F. Purinton

Inventor:
William H. Chapman,
by N. C. Lombard
Attorney.

(No Model.) 3 Sheets—Sheet 3.

W. H. CHAPMAN.
ELECTRIC MOTOR.

No. 447,939. Patented Mar. 10, 1891.

Witnesses:
Walter E. Lombard
H. F. Purinton

Inventor:
William H. Chapman,
by N. C. Lombard
Attorney.

THE NORRIS PETERS CO., PHOTO-LITHO., WASHINGTON, D. C.

UNITED STATES PATENT OFFICE.

WILLIAM H. CHAPMAN, OF PORTLAND, MAINE, ASSIGNOR TO THE GIANT ELECTRIC MOTOR COMPANY, OF SAME PLACE.

ELECTRIC MOTOR.

SPECIFICATION forming part of Letters Patent No. 447,939, dated March 10, 1891.

Application filed July 5, 1890. Serial No. 357,703. (No model.)

*To all whom it may concern:*

Be it known that I, WILLIAM H. CHAPMAN, of Portland, in the county of Cumberland and State of Maine, have invented certain new and useful Improvements in Electric Motors, of which the following, taken in connection with the accompanying drawings, is a specification.

My invention relates to electric motors of the multipolar type, and is an improvement upon the invention described in Letters Patent No. 428,454, granted to me May 20, 1890.

It consists in certain novel features of construction, arrangement, and combination of parts, which will be readily understood by reference to the description of the drawings, and to the claims hereinafter given, and in which my invention is clearly pointed out.

Figure 1:
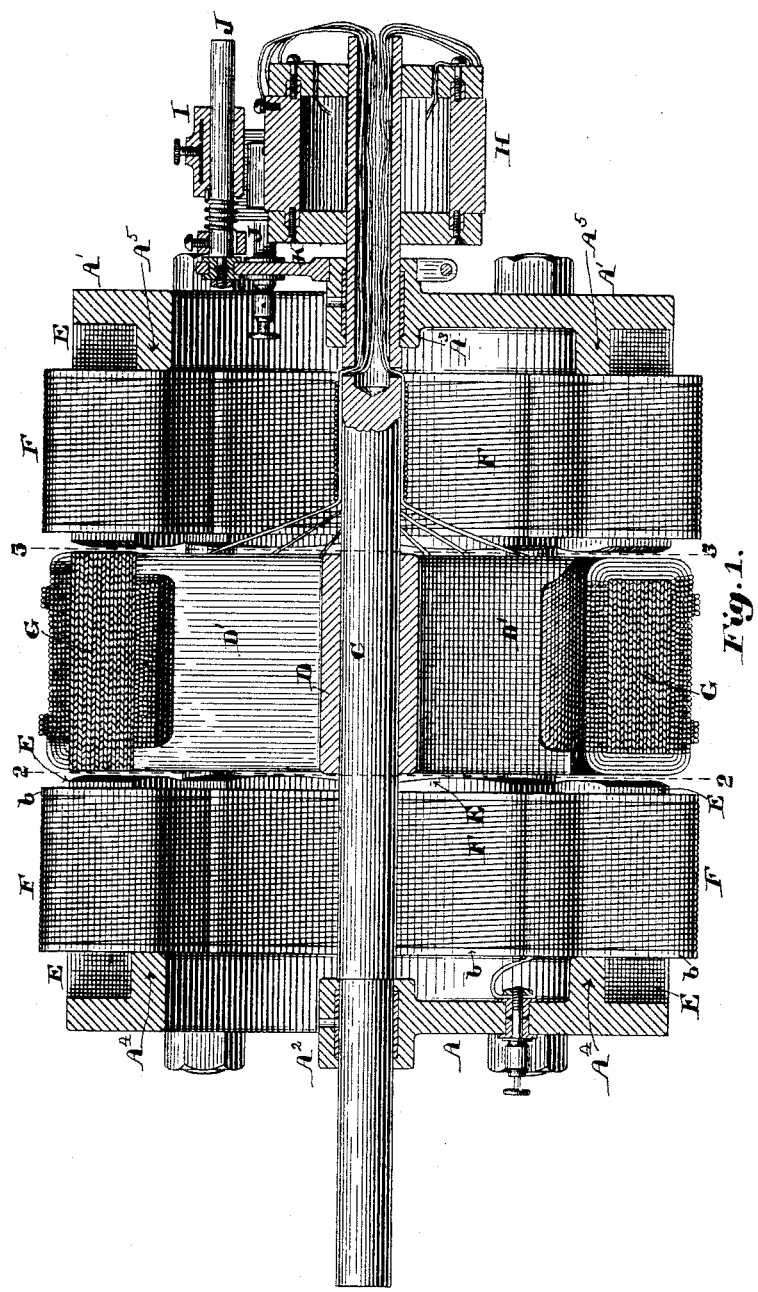
Figure 2:
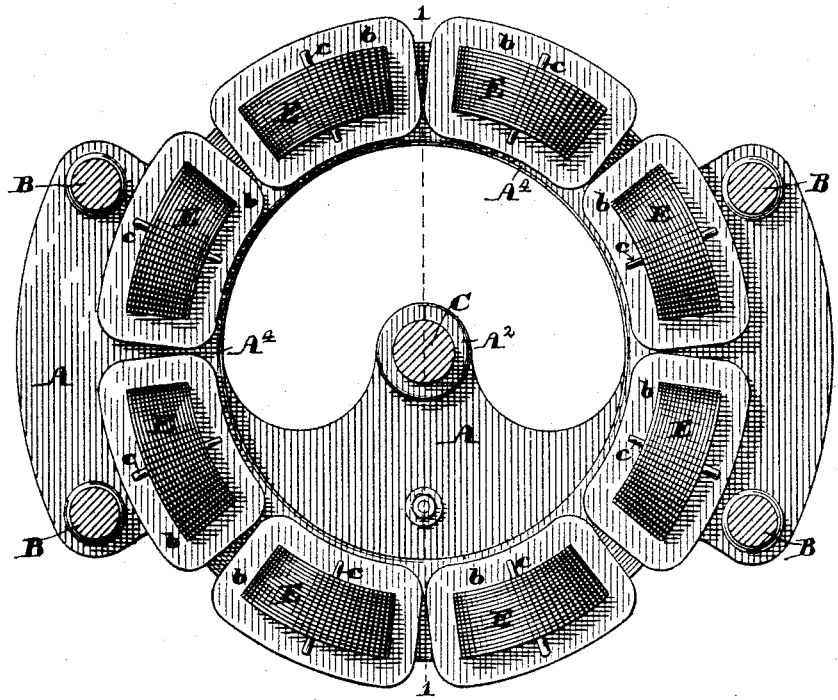
Figure 3:
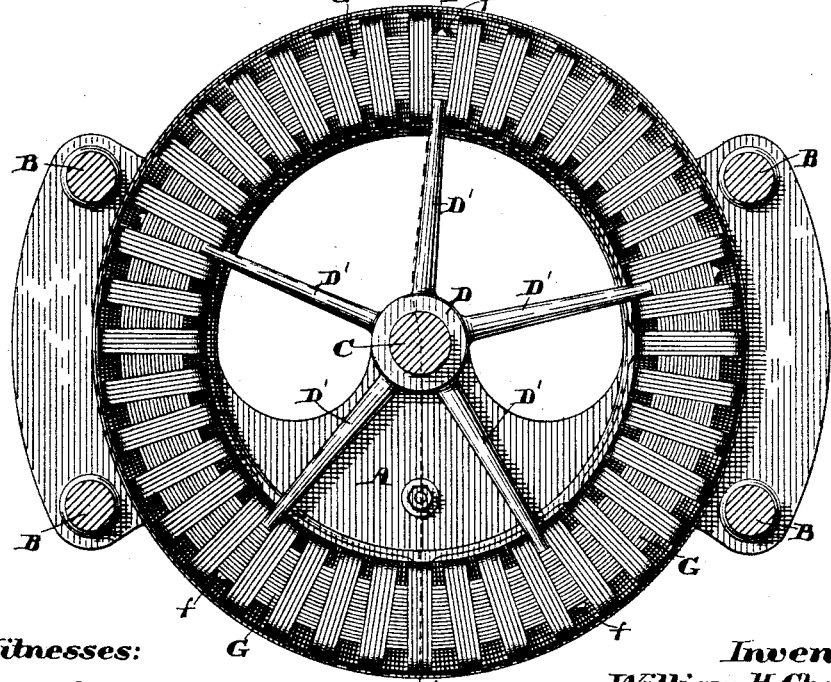
Figure 6:
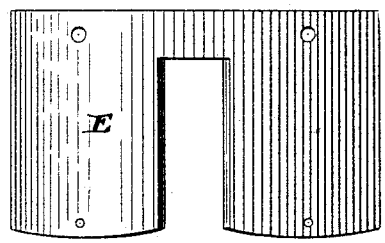
Figure 8:
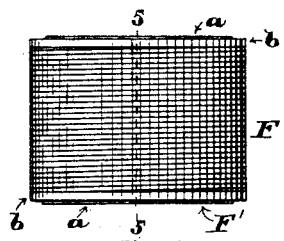
Figure 7:
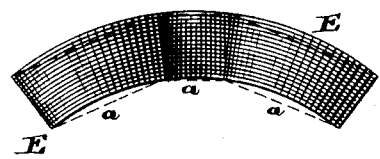
Figure 9:
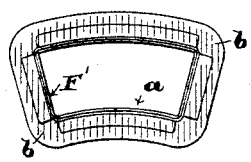
Figure 4:
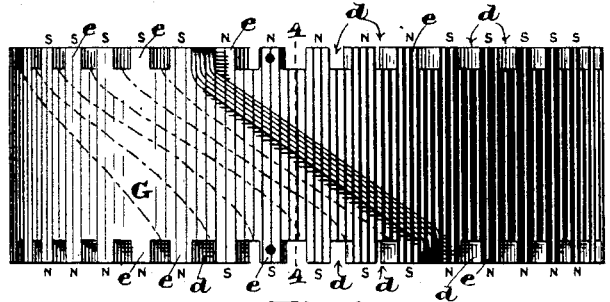
Figure 5:
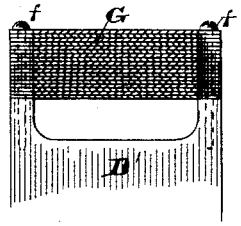

Figure 1 of the drawings is a vertical longitudinal section of an electric motor illustrating my invention, the cutting-plane taken on line 1 1 on Figs. 2 and 3. Fig. 2 is a sectional elevation, the cutting-plane being on line 2 2 on Fig. 1, looking toward the left of said Fig. 1. Fig. 3 is a vertical section on line 3 3 on Fig. 1 and showing the armature in elevation. Fig. 4 is an elevation of the laminated rim of revoluble armature with one coil of wire wound obliquely thereon. Fig. 5 is a transverse section through said rim on line 4 4 on Fig. 4, and illustrates the manner of securing it to the spokes of the supporting-spider, a portion of one of said spokes being shown in elevation. Figs. 6 and 7 are respectively a plan and an end view of a pair of laminated field-magnet cores or pole-pieces. Figs. 8 and 9 are respectively a plan and an end view of the coil of wire and its flanged sleeve to be fitted upon each of said cores, and Fig. 10 is a section of the flanged sleeve on line 5 5 on Fig. 8 with the coil of wire removed.

In the drawings, A and A' are the end frames of the machine connected together by the tie-girts B B, which may project beyond said end frames and enter bearings in bars or stands, (not shown,) by which the motor is supported.

C is the armature-shaft mounted in bearings $A^2$ and $A^3$ and having firmly secured thereon at a point equidistant from the two frames A and A', the hub D of the armature-spider, as shown in Fig. 1. The frames A and A' are provided with the inwardly-projecting annular ribs $A^4$ and $A^5$, respectively, upon which are secured by suitable bolts the field-magnet cores E E. These field-magnet cores E are made in pairs composed of a series of thin plates laid one above another, each plate forming a section of two cores and a connecting-tie, as shown in Figs. 6 and 7. These plates, which form the field-magnet cores, are shown as curved concentric to the axis of revolution of the armature, but they may be bent so as to occupy portions of three flat planes, each tangent to a circle concentric to said axis of revolution, as indicated by dotted lines *a a a* in Fig. 7, in which case the outer surfaces of the ribs $A^4$ and $A^5$ would be made up of a series of flat surfaces to fit the inner surfaces of said cores. The pole ends of the field-magnet cores E E are curved to arcs of circles for their entire widths, the axes of which circles are in planes cutting said cores longitudinally through the centers of their widths, as shown in Fig. 6, so that the motor will operate equally well with the armature revolving in either direction.

Figure 10:
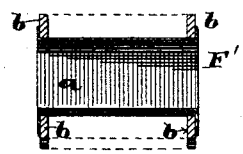

The field-magnet cores extend inward from the frames A and A' in positions parallel to the shaft C, and are each provided with a coil of wire F, wound, preferably, upon a removable spool or flanged sleeve F', composed of a paper tube *a*, and the fiber flanges *b*, made up by winding a ribbon of heavy paper around a form having the same cross-section as the core E till about three thicknesses are laid one upon the other and secured together by glue or other adhesive material, then slipping upon said tube the two fiber flanges of the desired thickness, one near each end of said tube, and then turning outward the end portions of the outer layer of the paper tube *a*, and securing such turned-out portions to the outer surfaces of the flanges *b* by glue or other adhesive material, as shown in Figs 9 and 10. These flanged sleeves F', with the coil of wire F thereon, are slipped upon the cores E and secured in position by the pins *c c*, and may be readily removed for renewal or repairs.

The armature is composed of a metal rim or hoop G, made, preferably, of a series of layers of thin metal plates, wound one over another and having a series of radial slots *d d* formed in the opposite edges thereof, with projecting pole ends *e e* between them, as shown in Figs. 3, 4, and 5, the number of said pole ends being some multiple of the number of field-magnet pole ends—as, for instance, in the machine illustrated there are eight field-magnet pole-pieces and the armature has forty pole ends on each edge of its rim G.

The armature rim or hoop G is fitted upon and secured to the outer ends of the spokes D', radiating from the hub D. by means of screws *f*, passing through the pole end projections and screwing into the ends of said spokes, the central portions of the spoke ends being cut short, as shown in Fig. 5, to afford a space for the passage of the wire of the coils with which said rim is wound.

The rim or hoop G is wound with as many independent coils of insulated wire as there are notches or grooves *d* formed in each edge thereof, said coils being wound obliquely around said rim, the coil which is wound into a given notch or groove on one edge of said rim being wound in a notch on the opposite edge of an angular distance from the first-mentioned notch equal to the angular distance between the centers of two field-magnet pole ends, or in the case illustrated a distance equal to one-eighth of the circumference of the armature-rim, as shown in Fig. 4, where one of the coils is shown in position in full lines and the positions of several others are shown in dotted lines.

H is the commutator, constructed substantially like the commutator shown and described in my before-cited patent. I is one of the brush-holders. J is the stud or arm for supporting the same, and K is the segmental plate clamped to the bearing $A^3$ and having secured thereto the studs J, all constructed and arranged substantially as in said prior patent, except that the commutator and the brushes are placed outside of the frame A instead of between said frames, as in said prior patent. The armature-coils are connected together in groups and to the commutator, and the field-magnet coils are connected together in series in precisely the same manner as described in my before-cited patent.

In making up the field-magnet cores from a series of plates I place a sheet of paper between each two plates, and in the construction of the laminated armature-ring I insert a strip of paper between the several layers of thin metal of which the ring is made up in a well-known manner.

Joints in a magnetic circuit increase the resistance of that circuit to the lines of force which are expected to pass and set up consequent poles at the point of juncture. Two adjacent cores in my improved motor are included in a magnetic circuit, and by doing away with the joint by making the two cores as one piece I avoid the free magnetism, which in the old form was a considerable loss.

What I claim as new, and desire to secure by Letters Patent of the United States, is—

1. In a multipolar motor, a series of field-magnet cores constructed and arranged in pairs, the two cores in each pair being placed parallel to the axis of revolution of the armature and connected together in one piece, but removed from contact with the cores of the next magnet and having their pole ends curved tangentially to a plane at right angles to the axis of revolution in both directions from the center of the width of each of said cores.

2. In a multipolar motor, a series of field-magnet cores constructed and arranged in pairs, the two cores of each pair being composed of a series of plates placed one above another and each forming a part of each core and being placed parallel to the axis of revolution of the armature, but removed from contact with the cores of the next magnet and having their pole ends curved tangentially to a plane at right angles to the axis of revolution in both directions from the center of the width of each of said cores.

In testimony whereof I have signed my name to this specification, in the presence of two subscribing witnesses, on this 1st day of July, A. D. 1890.

WILLIAM H. CHAPMAN.

Witnesses:
N. C. LOMBARD,
WALTER E. LOMBARD.